H. MATOBA.
TRACK GAGE AND LEVEL.
APPLICATION FILED MAY 29, 1919.

1,329,197.

Patented Jan. 27, 1920.

WITNESSES
Bernard Aeby
John K. Benelwergel

INVENTOR
Hisashi Matoba
BY
ATTORNEYS

UNITED STATES PATENT OFFICE.

HISASHI MATOBA, OF WHITEFISH, MONTANA.

TRACK GAGE AND LEVEL.

1,329,197.    Specification of Letters Patent.    Patented Jan. 27, 1920.

Application filed May 29, 1919. Serial No. 300,503.

*To all whom it may concern:*

Be it known that I, HISASHI MATOBA, a subject of the Emperor of Japan, and a resident of Whitefish, in the county of Flathead and State of Montana, have invented a new and Improved Track Gage and Level, of which the following is a full, clear, and exact description.

This invention relates to track gages and levels, and has reference more particularly to a combined track gage and level comprising a beam having track-engaging gage members, and a level-determining means the normal axis of which is at an angle with the normal, longitudinal axis of the device.

An object of the invention is to provide a simple, durable and inexpensive combined device for determining the gage and the level of railway and other tracks, which can be readily manipulated, and which is compact in form and light in weight.

A further object of the invention is to provide a combined track gage and level which can be employed for the purpose of determining the gage of the track, and which is so constructed that the gage elements will not interfere with the operation of the device as a level.

A still further object of the invention is to provide a combined track gage and level by means of which the level at any point of a railway or other track can be easily and expeditiously determined at sight, and in which the adjustable measuring element can be quickly set for different adjustments, and when so set be securely held in position.

The invention consists in the construction and combination of parts to be more fully described hereinafter and particularly set forth in the claims.

Reference is to be had to the accompanying drawings forming a part of this specification, in which similar characters of reference indicate corresponding parts, in all the views, and in which—

Figure 1:
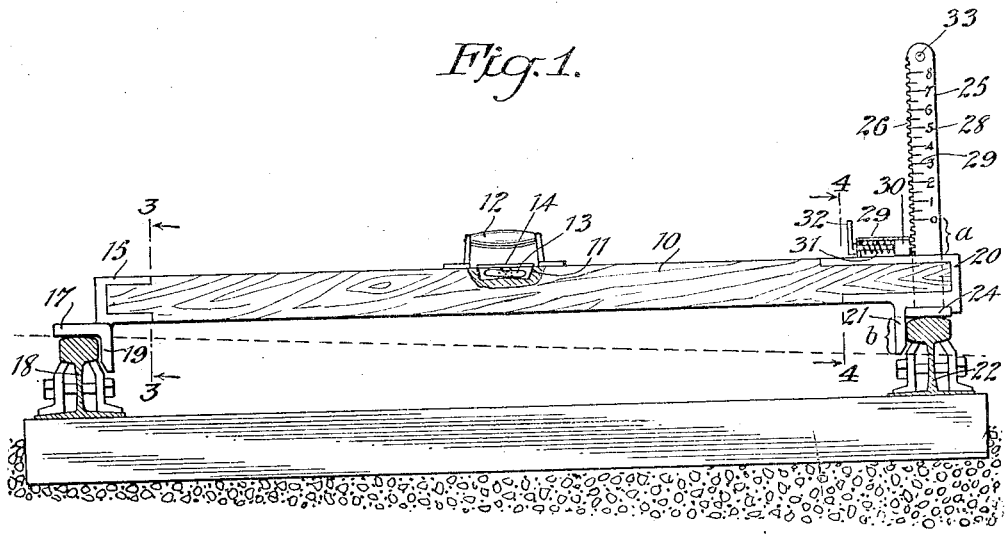
Figure 1 is a side elevation of an embodiment of my invention, showing the same in use, with parts shown in cross section.
Figure 2:
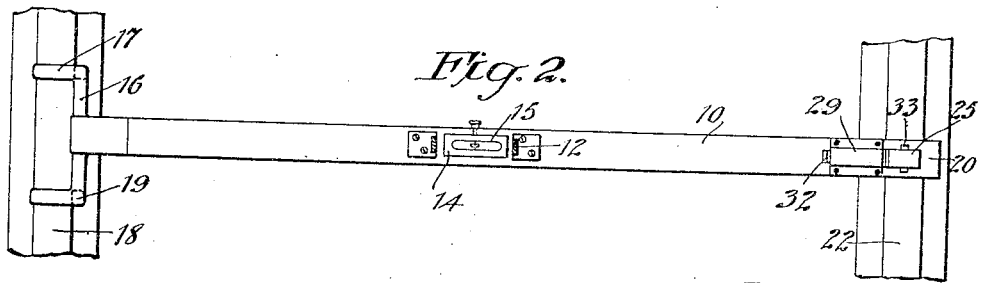
Fig. 2 is a plan view of the combined gage and level, showing parts in cross-section.
Figure 3:
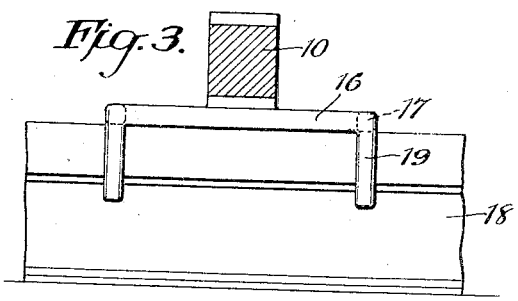
Fig. 3 is an enlarged transverse section on the line 3—3 of Fig. 1.
Figure 4:
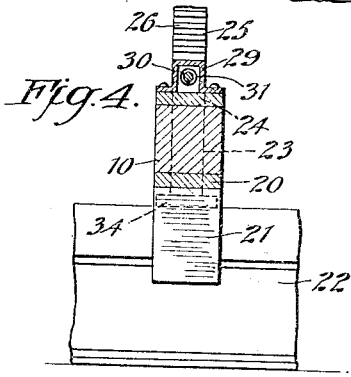
Fig. 4 is a similar cross-section on the line 4—4 of Fig. 1.

Before proceeding to a more detailed explanation of my invention it should be understood that the same can be fashioned from any suitable material adapted for the purpose, though I prefer to employ wood for the beam or body, and metal for the remaining parts. Certain of the details of construction shown in this device are similar to the corresponding details of the track-level disclosed in my copending application for Letters Patent of the United States, filed on the 29th day of May 1919, Serial No. 300,501. I wish to point out, further, that other details form no part of the invention and may be varied in accordance with individual preference or special conditions.

Referring more particularly to the drawings, the body of the device consists of a beam 10 of substantially rectangular section. The beam, in its upper surface, near its center, is provided with a recess 11, over which extends a handle 12, to permit the manipulation of the device. A spirit level 13 is disposed within the recess and is protected by a cover plate 14 having a sight-opening 15. The particular arrangement of the spirit level will be described hereinafter.

At one end, the beam 10 is reduced to receive a U-shaped bracket or frame 15 having near its outer, lower end a laterally-extending bar 16, which is at right angles to the length of the beam. At its extremities, the bar 16 has L-shaped track-engaging members, the upper arms 17 of which are designed to rest upon the upper surface of the head of the rail 18, and the downwardly-extending arms 19 of which contact with the inner side of the rail head.

At the other end, the beam is likewise reduced to receive an elongated U-shaped bracket or frame 20 which has extending downwardly from its lower side, a member 21 arranged to contact at the inner side of the head of the other track rail 22. It will be understood that the members 19 and 21 are the gage members proper, and that the distances between their outer surfaces is the gage or width of the track, to be determined. The beam 10 and the upper and lower members of the frame 20 are provided with registering openings 23 and 24 in which is slidably mounted a scale bar 25 constituting the measuring element. Its inner edge is provided with serrations 26 and it has inscribed thereon suitable graduations 27 and indicating numerals 28. A housing 29 is secured upon the top of the frame 20 and has therein a keeper 30 normally held in operative engagement with the serrations 26, by means of a spring 31. At its projecting end, the keeper has a handle 32 by means of which it may be manipulated. The measuring element, the keeper and their associated parts in this device are similar to the corresponding features shown in my co-pending application above referred to. At its upper end the scale bar has a stop 33 for limiting its downward movement. At its lower end it has a laterally extending foot or base 34 adapted to rest upon the upper surface of the head of the track 22.

The spirit level is so arranged in the recess 11 that its longitudinal axis is parallel with a line drawn from the upper surface of the head of the rail 18 to the lower end of the member 21, as is indicated by means of a dotted line, in Fig. 1. The lowermost or zero graduation of the scale bar begins at a point a substantial distance above the upper surface of the frame 20, when the scale bar is in its uppermost position, as is shown in Fig. 1. This distance is equal to the distance between the upper surface of the head of the rail 22 and the lower end of the member 21, as is indicated by brackets "$a$" and "$b$" in Fig 1. The purpose of this arrangement is as follows: The gage of the ordinary railway tracks will vary considerably. That is, if, for example, it were desired to determine the level of the track at a point where the gage is less than the normal gage, it would be impossible to position the device as shown in Fig. 1, as the members 19 and 21 could not be placed between the track rails as shown, and the device could therefore not be used as a level. By lowering the measuring element to a point such that the lower surface of the base 34 would lie in the same plane with the lower end of the member 21, the level 13 would be normal, and the device would then be operative as a level, regardless of the gage of the track.

As in the level shown in my co-pending application above identified, the beam in the present device is upwardly offset from the track-engaging members, so that it may be used at track crossings and intersections, and will clear intermediate rails, frogs and the like.

Having thus described my invention, I claim as new, and desire to secure by Letters Patent:—

1. A track gage and level, comprising a beam having track-engaging gage members and a straight spirit level fixed to said beam, the normal axis of which is at an angle with the normal longitudinal axis of the device.

2. A track gage and level, comprising a beam having track-engaging gage members and level-determining means, the normal axis of which is at an angle with the normal longitudinal axis of the device, and a measuring element adjustably carried by said beam.

3. A track gage and level, comprising in combination, a beam, track-engaging members near the ends thereof and each having a downwardly-extending gage element, and a spirit level fixed to said beam with its longitudinal axis at an angle with the length of said beam.

4. A track gage and level, comprising in combination, a beam, track-engaging members near the ends thereof and each having a downwardly-extending gage element, a spirit level carried by said beam and mounted with its longitudinal axis at an angle with the length of said beam, a level-measuring element adjustably carried by said beam, and means for holding said element in a plurality of adjusted positions.

5. A track gage and level comprising in combination a beam, track-engaging members near the ends thereof, and each having a part adapted to engage the upper surface of the rail head and a part adapted to extend downwardly at the side of the rail head, and a straight spirit level fixed to said beam, said spirit level being so disposed that its longitudinal axis is parallel to a line extending from the lower end of one of said downwardly extending parts of one of said track-engaging members to the under surface of said part adapted to engage the upper surface of the rail head of the other track-engaging member.

6. A track gage and level comprising in combination a beam, track-engaging members near the ends thereof, and each having a part adapted to engage the upper surface of the rail head and a part adapted to extend downwardly at the side of the rail head, and a spirit level carried by said beam, said spirit level being so disposed that its longitudinal axis is parallel to a line extending from the lower end of one of said downwardly extending parts of one of said track-engaging members to the under surface of said part adapted to engage the upper surface of the rail head of the other track-engaging member, and a level measuring element adjustably carried by said beam, near one end thereof.

HISASHI MATOBA.